Jan. 4, 1949.  G. A. LYON  2,458,490
WHEEL COVER
Filed Dec. 8, 1944  3 Sheets-Sheet 1
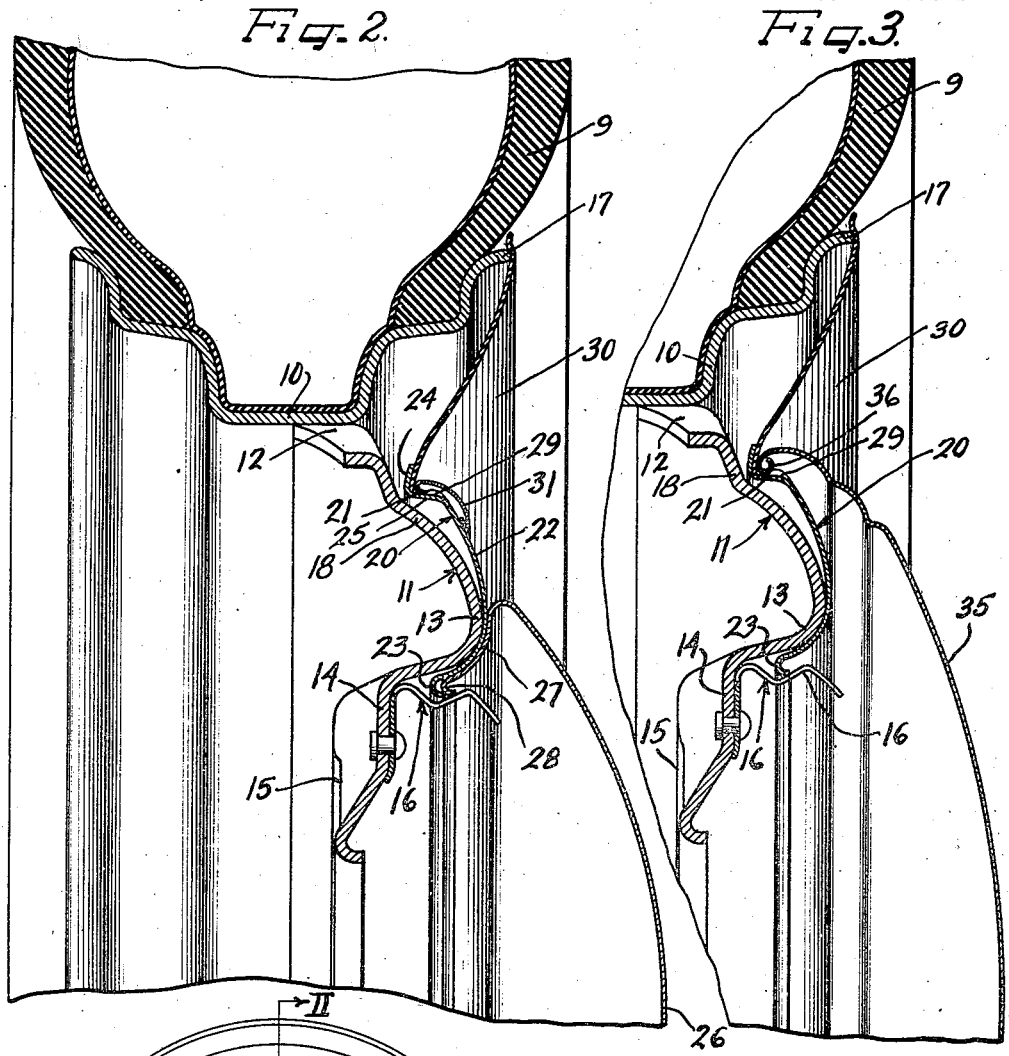
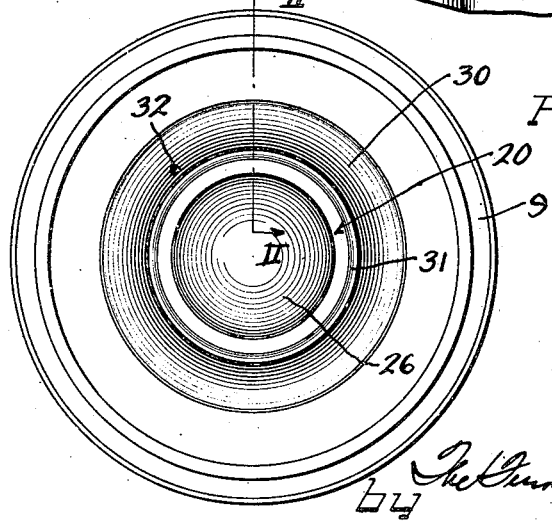
Inventor
GEORGE ALBERT LYON Jan. 4, 1949.                    G. A. LYON                    2,458,490
                                WHEEL COVER
Filed Dec. 8, 1944                                      3 Sheets-Sheet 2
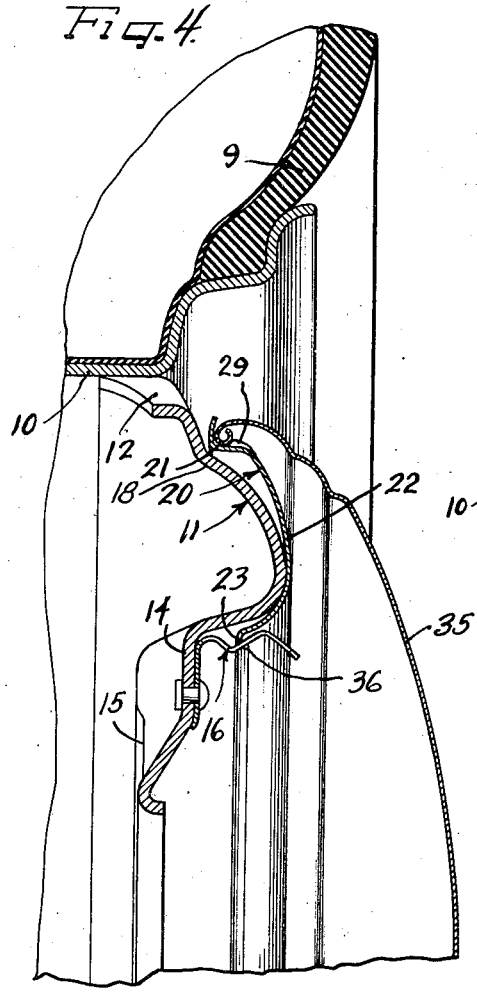
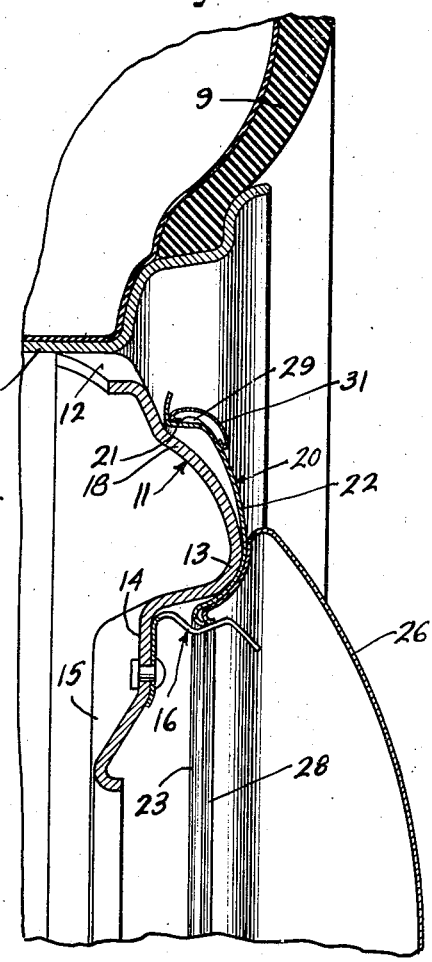
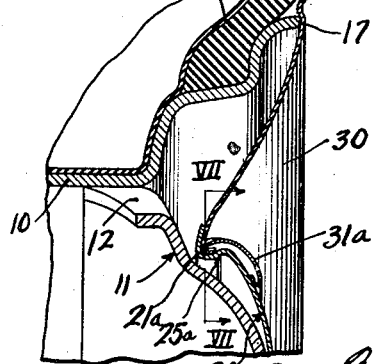
Inventor
GEORGE ALBERT LYON Jan. 4, 1949. G. A. LYON 2,458,490
WHEEL COVER
Filed Dec. 8, 1944 3 Sheets-Sheet 3
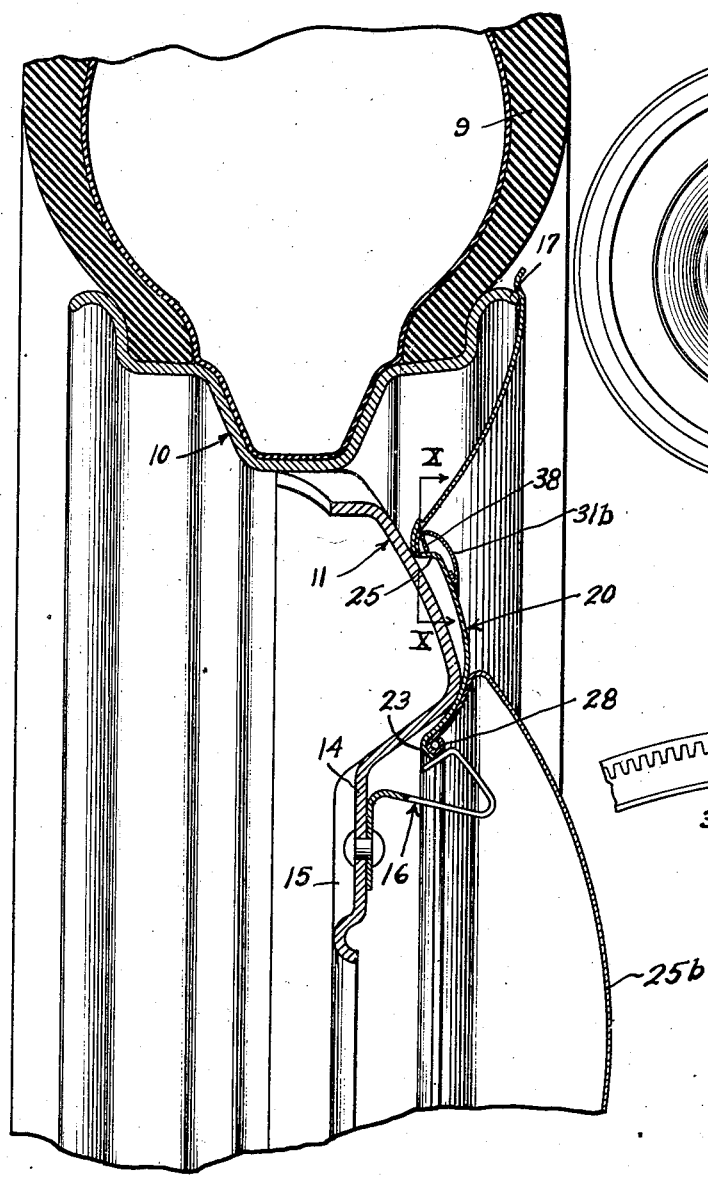

Patented Jan. 4, 1949

2,458,490

UNITED STATES PATENT OFFICE 2,458,490

WHEEL COVER

George Albert Lyon, Allenhurst, N. J.

Application December 8, 1944, Serial No. 567,191

14 Claims. (Cl. 301—37)

This invention relates to a wheel trim and more particularly to an ornamental cover for an automobile wheel.

An object of this invention is to provide an ornamental automobile wheel accessory with which any one of a plurality of the different trim elements may be selectively used or with which several of the trim elements may be collectively used together.

Another object of this invention is to provide a trim in the form of a retaining ring detachably cooperable with the wheel and formed to selectively receive and retain, as desired, several different types of trim rings and several different types of hub caps.

Yet another object of this invention is to provide a composite wheel trim assembly involving a plurality of trim elements selectively useable together in different combinations to provide different ornamental and color effects on a wheel.

In accordance with the general features of this invention there is provided a wheel trim retaining element comprising an annulus having an outer substantially right angular portion facing radially outwardly, an intermediate portion of curved convex cross-sectional shape to fit over a wheel body and a radially and axially inner turned edge for detachable engagement by retaining elements on a wheel.

In accordance with other features of the invention there is provided in a cover structure for a wheel including tire rim and wheel body members a circular trim for the wheel body member and formed for detachable engagement therewith, the trim being provided with an outer flange portion to interchangeably receive and retain the inner edge of the radially outer trim ring element, the outer edge of a hub cap element, and the outer edge of an ornamental bead element, several of these trim elements, if it is so desired, being useable in a common assembly with said circular trim.

Still other features of the invention relate to the provision of a plurality of different structures for retaining the edges of cooperable trim elements on a common retaining ring detachably securable to a wheel body.

Other objects and features of this invention will more fully appear from the following detailed description taken in connection with the accompanying drawings which illustrate several embodiments thereof, and in which Figure 1 is a side view of one form of my novel trim assembly showing it applied to a wheel and tire;

Figure 2 is an enlarged fragmentary cross-sectional view taken on substantially line II—II of Figure 1, looking in the direction indicated by the arrows;

Figure 3 is a sectional view similar to Figure 2, showing a modification of the invention wherein a single larger hub cap is substituted for the smaller hub cap and bead in Figure 2;

Figure 4 is a sectional view similar to Figure 3 with the radially outer trim ring omitted;

Figure 5 is a sectional view similar to Figure 2 with the radially outer trim ring omitted;

Figure 6 is a fragmentary sectional view similar to Figure 2, showing a different way of holding the bead on the main retaining ring;

Figure 7 is a fragmentary detail view taken on line VII—VII of Figure 6, looking in the direction indicated by the arrows and showing the construction of the rear edge of the ornamental bead;

Fig. 8 is a side view of a modification of my invention showing it applied to a wheel and tire;

Figure 9 is an enlarged fragmentary cross-sectional view taken on the line IX—IX of Figure 8, looking in the direction indicated by the arrows; and Figure 10 is a fragmentary detailed view taken on the line X—X of Figure 9, showing the rear construction of the edge of the ornamental bead.

As shown on the drawing:

At the outset, it should be noted that in the several views the same reference numerals are employed to designate like or corresponding parts common to the different modifications of the invention.

This is particularly true of the tire and wheel inasmuch as these elements are substantially conventional elements in the art, my invention being particularly concerned with the provision of novel ornamental trim assemblies for such wheels.

The reference character 9 designates generally a conventional pneumatic tire and tube seated in the usual way in a conventional drop center multi flange tire rim 10. This tire rim is secured in any suitable manner and is carried by a wheel body part or spider designated generally by the reference character 11. This spider usually comprises a metal stamping and is of a shell like construction of sufficient strength to be effective as a load bearing part.

If it is so desired, the body part 11 may be secured at spaced intervals to the base of the rim 10, leaving the usual transverse wheel openings 12.

The spider is of a curved convex configuration and is bulged to form a curved nose 13 terminating at a recessed or depressed central portion 14, having the usual bolt on flange 15. Any suitable bolts or cap screws (not shown) may be employed for securing this wheel in a manner well known in the art to an element on an axle or the like.

Secured to the recessed portion of the body member is a plurality of spaced spring clips 16, which may be of any suitable number, such as three or five. These clips are more or less conventional in the automobile industry and are frequently referred to as an inverted type of spring clip.

The spring clips 16 function to detachably retain a hub cap on the wheel body member and enable what is called in the art an easy-on and a hard-off action with respect to the hub cap. That is to say, the hub cap is easily pressed into retained engagement with the spring clips due to the camming of the free hook-like extremities of the clips, but is more difficult to remove and requires the application of a substantial pry-off force to the cap in order to remove it. Such a structure is fully disclosed in the prior patented art, including numerous patents that have heretofore been granted to myself.

The present invention is concerned particularly with the provision of an ornamental trim assembly for this wheel, which in each case embodies at least a novel metal retaining ring designated generally by the reference character 20 and one or more trim elements, such as a hub cap and an ornamental ring cooperable therewith. The aim of the invention is to provide a retaining ring 20 with which may be selectively employed with any one of the number of different trim elements which I shall hereinafter describe.

The retaining ring 20 as shown in Figure 2 embodies a right angular outer margin or edge portion 21, an intermediate curved convex portion 22 and an inner curved edge 23. The intermediate portion is of such cross sectional shape as to closely conform with the outer surface of the nose 13 of the wheel body. The angular flange portion 21 includes a radially outwardly extending leg 24 and an axially extending leg 25. The leg 25 is formed into a plurality of radially outwardly extending spaced protuberances 29.

It will be perceived from Figure 2 that the flange portion 21 is arranged to telescope a portion of the wheel body at 18 where there is a slight indentation of the wheel body. It will also be noted that the intermediate portion 22 is curved to extend around the nose portion 13 of the body member into the central depressed portion of the body member so as to be clamped to the body member by the usual hub cap 26. This hub cap 26 has an underturned skirt 27 and a continuous turned edge 28 adapted to be cammed over the high points of the extremities of the spring clips 16 into nested relation with the turned inner edge 23 of the retaining ring 20.

Cooperable with the angular flange portion 21 of the ring is a radially outer ornamental trim ring 30 which may be made of any suitable material, such for example, as thin resilient metal, or better yet, synthetic plastic material. Excellent results may be obtained by making this ring of a synthetic thermoplastic, such for example as ethyl cellulose.

The outer edge of this ring 30 is adapted to overhang at 17 the curved outer edge of the tire rim 10 in close proximity to the side wall of the tire 9. The radially inner edge of the ring 30 is arranged to tightly seat on the axial leg 25 of the angular portion behind the protuberances 29 and against the radial leg 24 so as to be backed up and reinforced thereby. If it is so desired, the inner edge of the ring 30 may be sprung over the bumps 29 into tensioned engagement with the flange portion 21. As will be perceived, this provides a cover in which not only the cover portion or section 20 and its flange 24 but also the cover portion or section 30 and the cover section 20 are divergently related and form at their axially inwardly extending juncture a generally axially outwardly opening groove formation, at the radially inner side of which the leg 25 provides a generally radially outwardly facing shoulder having the retaining elements or protuberances 29.

In order to enhance the retention of the trim ring 30 on the retaining ring 20 and to reinforce the cover assembly there is provided an ornamental bead 31 of a curved hollow cross sectional shape, having turned inner and outer edges. The turned outer edge is of such diameter as to be adapted to be sprung over and behind the bumps 29 and so as to tightly clamp the inner edge of the trim ring 30 against the leg 24 of the flange portion 21.

The rim elements of the foregoing assembly are all readily detachable and may be quickly and easily assembled on the wheel. Moreover, the hub cap 26 may be removed when it is desired to have access to the wheel fastening bolts without necessitating the removal of the other elements of the trim assembly. It is clear that after the hub cap is removed, the free extremities of the spring elements 16 will spring outwardly against the turned edge 23 of the retaining ring 20 to temporarily hold the retaining element and the parts attached thereto on the wheel. Moreover, if the retaining ring 20 is made of springy material, such as resilient steel, the turned inner margin of this ring may be pressed under tension against the wheel body when the hub cap is snapped home into retained engagement with the spring clips 16.

It should be noted at this time that in all forms of the invention employing an outer trim ring, such as ring 30 for concealing the exposed flanges of the tire rim, the ring may be provided with an aperture 32 as shown in Figure 1, through which the end of the usual valve stem may project in order to afford access to the valve stem without the necessity of removing the trim assembly from the wheel. Of course, it is to be understood that in the event the radially outer trim ring, such as a ring 30, is made of plastic material, access could be had to the valve stem, in the event a shorter valve stem is used, by merely flexing an outer portion of the trim ring bodily away from the wheel to an extent sufficient to get to the valve stem. I have found by using a synthetic plastic such as ethyl cellulose, the trim ring will possess sufficient body to be self-sustaining as to form and yet not be permanently distortable upon manual deflection or slight indentation.

In the assembly described in connection with Figure 2, many different contrasting color effects are feasible. For instance, the trim ring 30 may be given a white or eggshell exterior finish in which event it will appear to constitute a continuation of the side wall of the tire, or in other words, giving the effect of the tire having a white side wall and of the tire extending clear down to the retaining ring 20. The bead 31 can be given a highly lustrous finish and exceptionally good results can be obtained by making this ring of stainless steel. The hub cap may be made in the usual way with the customary emblem and may have the usual highly lustrous external surface. The exposed portion of the retaining ring 20 is also part of the ornamental color scheme, and may, for example, have a finish corresponding to the finish and color of the automobile body.

In Figure 3 I have illustrated a modification of the invention wherein the same retaining ring 20 and trim ring 30 are employed as used in Figure 2. However, in lieu of the small hub cap 26 and the bead 31 there is employed a larger hub cap 35 which has its inner turned edge 36 sprung over the bumps 29 on the flange portion 21 of the ring 20. It will also be perceived from this form of the invention that the spring clips 16 are in direct retaining engagement with the inner turned edge 33 of retaining ring 20.

In this form of the invention, a trim assembly is provided wherein the tire appears to extend clear down to the outer margin of the hub cap 35, giving the appearance of a large tire with a central hub cap covering all of the wheel.

In Figure 4 I have illustrated a form of the invention substantially similar to Figure 3 with the exception of the omission of the outer trim ring 30. If it is so desired, the inner turned edge 23 of the retaining ring 20 may be provided with a plurality of notches 36, one for each of the spring clips 16. This is an optional feature, but is desirable from the standpoint that the use of this feature tends to preclude rotation of the retaining ring 20.

In Figure 5 I have illustrated a still further form of the invention which is substantially identical to the form described in Figure 2, with the exception that the trim ring 30 has been omitted. The same reference numerals are employed in this figure as well as in others to designate the common or substantially similar parts.

In Figures 6 and 7 I have illustrated the form of the invention similar to that shown in Figure 2 with the exception that a slightly different way of retaining the bead 31a is employed. In this form of the invention, retaining ring 20a has an angular flange portion 21a with a horizontal leg which is grooved at 25a. The bead 31a has inner and outer turned edges and the outer turned edge is provided with a plurality of indentations providing bumps 37 adapted to be sprung into the groove 25a when the bead 31a is pressed home into retained engagement against the inner edge of the trim ring 30.

In Figures 8, 9 and 10 I have illustrated a still further form of the invention which is substantially identical to the form shown in Figure 2. In this form of the invention, the bead 31b has its outer edge provided with a plurality of spaced inclined resilient fingers 38 adapted to be cammed over the horizontal leg 25 of the ring 20 for the purpose of holding the bead on the wheel.

Also there is a slight difference in the type of hub cap 25b in that it has a rolled inner edge 28 arranged to be seated in the inner turned edge 23 of the retaining ring 20.

In this modification the trim elements all cooperate in substantially the same general way as in Figure 2 and enable the same advantageous features as obtained in the case of the first form.

Also in the different forms the trim elements thereof may be made of the same types of material and have the same purpose as described in connection with the trim elements of the assembly of Figure 2.

I claim as my invention:

1. As an article of manufacture a wheel trim retaining element comprising an annulus having a radially outer substantially right angular portion facing radially outwardly, an intermediate portion of curved convex cross sectional shape to fit over a wheel body and a radially and axially inner turned edge for detachable engagement by retaining elements on a wheel, said right angular portion including a radial leg at the axially inner side of the angular portion to serve as a backing for an edge of a trim element and an axial leg extending axially outwardly from the radially inner edge of the radial leg to juncture with the intermediate portion and forming a seat for the edge of the trim element.

2. As an article of manufacture a wheel trim retaining element comprising an annulus having an outer substantially right angular portion facing radially outwardly, an intermediate portion of curved convex cross sectional shape to fit over a wheel body and a radially and axially inner turned edge for detachable engagement by retaining elements on a wheel, said right angular portion including a radial leg to serve as a backing for an edge of a trim element and an axial leg forming a seat for the edge of the trim element, said axial leg having radially outwardly extending protuberance means over and behind which an edge of the trim element is adapted to be cammed.

3. As an article of manufacture a wheel trim retaining element comprising an annulus having an outer substantially right angular portion facing radially outwardly an intermediate portion of curved convex cross sectional shape to fit over a wheel body and a radially and axially inner turned edge for detachable engagement by retaining elements on a wheel, said right angular portion including a radial leg to serve as a backing for an edge of the trim element and an axial leg forming a seat for the edge of a trim element, said axial leg having a groove extending in a radial direction for retaining cooperation with the edge of the trim element.

4. As an article of manufacture a wheel trim retaining element comprising an annulus having an outer substantially right angular portion facing radially outwardly, an intermediate portion of curved convex cross sectional shape to fit over a wheel body and a radially and axially inner turned edge for detachable engagement by retaining elements on a wheel, said inner edge being notched for the reception of retaining springs on a wheel in the positioning and centering of the trim retaining element on the wheel body.

5. In a cover structure for a wheel including tire rim and wheel body members, a circular trim structure formed for detachable engagement with the wheel, a flange device annularly circumscribing said trim structure and including a radially outwardly facing shoulder flange and a radially extending supporting flange at the axially inner margin of said shoulder flange, a trim ring member seated at its inner edge upon said radially extending flange and extending into covering relation to said tire rim member, and another cover member engaging said shoulder flange and clamping said trim ring member against said radially extending flange.

6. In a cover assembly for disposition over the outer side of a wheel including a tire rim, a central load bearing portion and cover retaining means, an annular cover member including a radially outer annular element formed from yieldable plastic material or the like, an annular retaining element and an annular trim member, said radially outer annular element having the radially inner margin thereof arranged to engage the radially outer portion of said annular retaining element, said last named element having at the radially outer part thereof a circular grooved portion for receiving the radially inner margin of said annular plastic element, said annular retaining element also including a generally axially outwardly extending flange portion and a generally radially inwardly extending flange portion, said annular trim member being arranged to bitingly engage the radially outer surface of said axially extending flange to retain said radially outer and retaining elements together.

7. In a cover structure for a wheel including a tire rim and a body part, a cover including an outer annular portion for disposition over the tire rim, an inner cover portion convergently united with said outer cover portion in a manner to provide a generally axially outwardly opening juncture groove and arranged for disposition over the body part, said inner cover portion having a generally radially facing shoulder at said junction, retaining bumps extending radially outwardly from said shoulder, and a bead member extending into said junction groove and engaging in snap-on relationship with said bumps.

8. In a wheel cover, inner and outer concentric sections having an axially inwardly extending junction providing an axially outwardly opening groove structure defined at its inner side by a radially outwardly facing shoulder, trim retaining protrusions extending radially outwardly from said shoulder, and a reinforcing ornamental bead for the cover retained in snap-on engagement with said protrusions at said shoulder.

9. In combination in a wheel cover, inner and outer concentric cover sections, said sections being joined together in generally divergent relationship with their junction extending generally axially inwardly and defining a generally axially outwardly opening groove between the sections, one of said sections having a generally radially facing shoulder including retaining protrusions, and a reinforcing ornamental annulus having a turned edge extending into said groove and retainingly engaging said protrusions.

10. In combination in a wheel cover adapted to be applied to the outer side of a vehicle wheel comprising a tire rim and a load sustaining body portion, radially inner and outer concentric cover sections extending in generally divergent directions from their junction, the outer of said sections being adapted to cover the tire rim and having a convex generally tire side wall simulating shape and the inner of said sections being adapted to lie in body concealing relationship, the junction between said sections providing a generally axially outwardly opening groove defined at its inner section side by a generally radially outwardly facing shoulder, radially outwardly protruding trim retaining protrusions on said shoulder, and a reinforcing and ornamental bead structure having a turned edge extending substantially to the root of said groove and being retained by said protrusion in snap-on relationship.

11. In combination in a cover structure to be applied to the outer side of a vehicle wheel, a cover member comprising a portion of generally convex cross section adapted to engage the wheel in retained relation and having a generally radially facing shoulder structure including an annularly spaced series of protruding elements, and another cover member having a generally axially inwardly extending marginal portion in retained engagement with said elements and extending convexly beyond the shoulder over said convex cover portion.

12. In combination in a cover structure for the outer side of a vehicle wheel, a cover member including divergent portions one of which is of generally convex cross section and has a generally radially facing shoulder at the convergence of the cover portions, said convex cover portion being constructed and arranged for cover retaining engagement with the wheel, and a second cover member having a generally axially inwardly extending margin formed to engage said shoulder retainingly and extending generally convexly over and beyond the shoulder and over the convex cover portion.

13. In combination in a cover structure for the outer side of a vehicle wheel, an annular cover member including divergent portions, the radially inner of such portions being of generally convex shape and having the radially inner margin thereof constructed and arranged for retaining engagement with the wheel, said inner cover portion being formed at the junction with the radially outer divergent cover portion to provide a generally radially outwardly facing shoulder, and another cover member having a generally axially inwardly extending margin constructed and arranged to engage said shoulder retainingly and extending from said margin generally axially outwardly and radially inwardly over the convex inner cover portion.

14. In combination in a cover structure for the outer side of a vehicle wheel, an annular cover member including divergent portions, the radially inner of such portions being of generally convex shape and having the radially inner margin thereof constructed and arranged for retaining engagement with the wheel, said inner cover portion being formed at the junction with the radially outer divergent cover portion to provide a generally radially outwardly facing shoulder, and another cover member having a generally axially inwardly extending margin constructed and arranged to engage said shoulder retainingly and extending from said margin generally axially outwardly and radially inwardly over the convex inner cover portion, said shoulder having an annularly spaced series of radially outwardly protruding retaining elements retainingly engageable with the axially inwardly extending margin of the last-named cover member.

GEORGE ALBERT LYON.

REFERENCES CITED

The following references are of record in the file of this patent:

UNITED STATES PATENTS

| Number | Name | Date |
| --- | --- | --- |
| Re. 21,179 | Lyon | Aug. 22, 1939 |
| 2,022,128 | Lyon | Nov. 26, 1935 |
| 2,190,669 | Lyon | Feb. 20, 1940 |
| 2,298,669 | Wood | Oct. 13, 1942 |
| 2,306,631 | Lyon | Dec. 29, 1942 |
| 2,326,788 | Lyon | Aug. 17, 1943 |